(12) United States Patent
Burkhart et al.

(10) Patent No.: US 12,246,641 B1
(45) Date of Patent: Mar. 11, 2025

(54) WIRING SOCKET ADAPTER WITH TOW ZONE ILLUMINATION

(71) Applicant: DANKO MANUFACTURING LLC, Castle Rock, CO (US)

(72) Inventors: Jerad M. Burkhart, Castle Rock, CO (US); Daniel L. Decker, Jr., Castle Rock, CO (US)

(73) Assignee: Danko Manufacturing LLC, Castle Rock, CO (US)

( * ) Notice: Subject to any disclaimer, the term of this patent is extended or adjusted under 35 U.S.C. 154(b) by 0 days.

(21) Appl. No.: 18/809,056

(22) Filed: Aug. 19, 2024

(51) Int. Cl.
  *B60Q 1/24* (2006.01)
  *F21S 41/141* (2018.01)
  *F21S 41/19* (2018.01)
  *F21V 21/16* (2006.01)
  *F21Y 105/10* (2016.01)
  *F21Y 115/10* (2016.01)

(52) U.S. Cl.
  CPC ............ *B60Q 1/247* (2022.05); *F21S 41/141* (2018.01); *F21S 41/192* (2018.01); *F21V 21/16* (2013.01); *F21Y 2105/10* (2016.08); *F21Y 2115/10* (2016.08)

(58) Field of Classification Search
  CPC .... B60Q 1/247; F21S 41/14–16; F21V 21/16; F21Y 2105/10; F21Y 2115/10
  See application file for complete search history.

(56) References Cited

U.S. PATENT DOCUMENTS 11,075,489 B2 * 7/2021 Kageta ................... H04N 23/57

* cited by examiner

*Primary Examiner* — Jason M Han
(74) *Attorney, Agent, or Firm* — LOZA & LOZA LLP; Gordon R. Lindeen, III (57) ABSTRACT

A wiring socket adapter is described that is configured to provide tow zone illumination. In embodiments the adapter includes a housing, a plug at a first end of the housing configured to be attached to a trailer wiring socket of a vehicle, and a socket at a second end of the housing configured to be attached to a trailer wiring plug. A lamp is at the second end of the housing and an electrical lead is coupled to the lamp at the second end of the housing to power the lamp and coupled to the socket at the first end of the housing to receive power from the socket.

20 Claims, 7 Drawing Sheets

WIRING SOCKET ADAPTER WITH TOW ZONE ILLUMINATION

FIELD

The present description pertains to the field of illumination for towing and, in particular, to a wiring socket adapter with tow zone illumination.

BACKGROUND

Trailers and towed vehicles are equipped with rear lights to act as running lights, brake lights, and turn indicators when the trailer or towed vehicle is being towed. The tow vehicle will typically have a trailer wiring socket to receive a trailer wiring plug that is electrically attached to the trailer. The trailer wiring plug is connected through the socket to the lamps at the rear of the trailer to activate running lights, brake lights and turn indicators in lamp housings. The trailer wiring socket may provide additional pins for ground, electric brakes, power, and other trailer needs. For a towed vehicle, an adapter wiring harness can be attached to the towed vehicle lights to allow those lights to be operated by the tow vehicle through the trailer wiring plug. In some implementations, auxiliary light housings are attached to the rear of the towed vehicle to be used instead of lights that are built into the vehicle.

The connectors for trailer wiring have been in the form of round plugs and sockets for many years and these round connectors still predominate, although linear or flat connectors are common for lighter trailers. The socket is mounted to the tow vehicle and the plug is attached to the trailer. For towed vehicles, the towed vehicle may have a trailer wiring socket at the front of the vehicle facing the trailer wiring socket at the rear of the tow vehicle. An extension cable with a trailer wiring plug at each end connects the two sockets together and is easily removed from the front of the towed vehicle when the towed vehicle is unhitched from the tow vehicle. The sockets and plugs commonly come in 7-pin, 6-pin, 5-pin, and 4-pin versions. In some cases, square, flat, round, or other connector configurations are used, and higher pin counts may be used to suit particular types of trailers.

BRIEF DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

DETAILED DESCRIPTION

The area between the rear of the tow vehicle and the front of the towed vehicle is often referred to as the tow zone. Depending on the nature of the vehicles, this may be described as the area between the rear bumper of the front vehicle and the front bumper of the rear vehicle. It is also the area that includes the hitch, hitch receiver, tow bar, breakaway cables, etc. The tow zone is often poorly illuminated by the tail lights of the tow vehicle. There is no generally accepted system for safely illuminating this area when the tow vehicle and the towed vehicle are underway. This makes it difficult for the driver of the tow vehicle to see the towed vehicle when it is attached to the hitch of the tow vehicle at night. Even when the tow vehicle is fitted with rear cameras with a view of the tow zone and the front of the towed vehicle, such a camera may not provide a clear view in the dark.

The dark tow zone presents a further safety risk. When the tow vehicle is underway in the dark, it requires careful observation for other drivers to see that there is a towed vehicle behind the tow vehicle. In the dark, it may appear that there is an open space behind the tow vehicle. When the only illumination is the tail lights of the tow vehicle, it has happened that other drivers attempt to change lanes into the lane of the tow vehicle behind the tow vehicle. These other drivers fail to notice that there is a towed vehicle hitched to the tow vehicle and maneuver directly into the space occupied by the towed vehicle. An inattentive driver may expect all vehicles to have headlights. This safety risk is also present when a trailer is the towed vehicle which should not be expected to have headlights.

The tow zone may be illuminated conveniently using the adapter described herein. The adapter may be attached to the towed vehicle to create an effect similar to a head light of the towed vehicle or attached to the tow vehicle to create an effect similar to a reversing light. With sufficient reflective surfaces in the tow zone, the specific location of the light source may not be significant.

Figure 1:
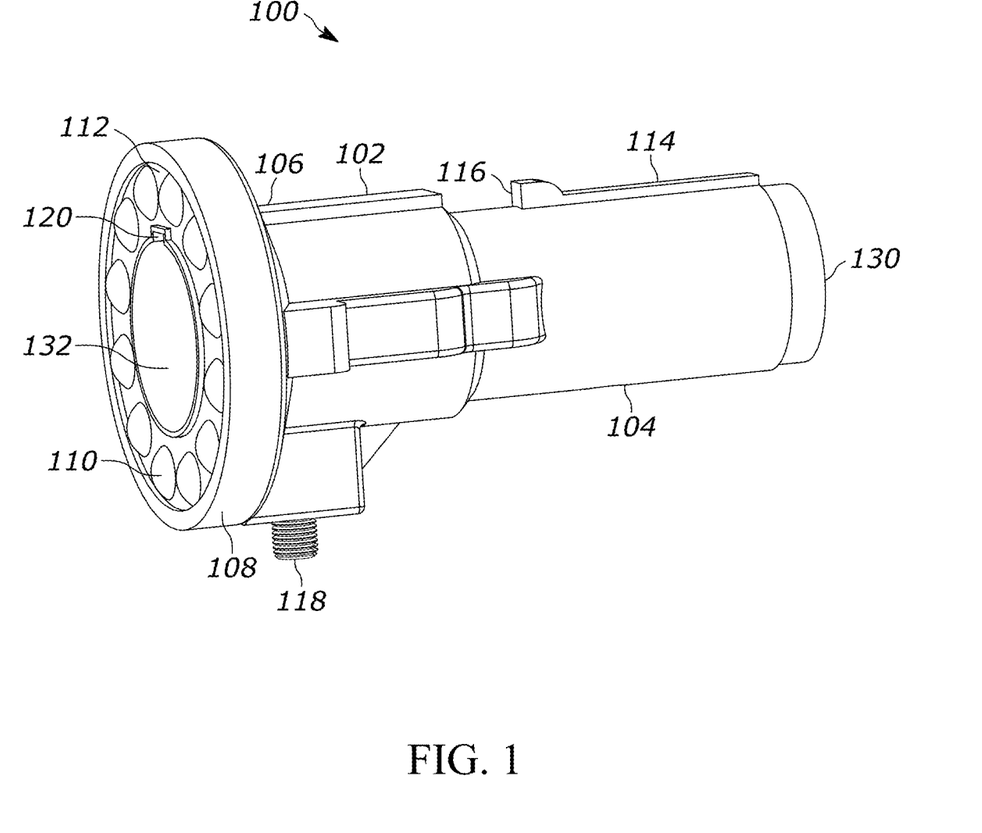
FIG. 1 is an isometric view of a wiring socket adapter according to embodiments of the invention.

FIG. 1 is an isometric view of a wiring socket adapter 100. The adapter has a main body in the form of a housing 102 with a plug end 104 at one end of the adapter 100 and a socket end 106 at an opposite second end of the adapter 100. The socket end is the lamp end as there is a lamp 110 at or near that end. At the plug end 104, a plug 130 is configured to be inserted into a socket of a trailer wiring socket (not shown) of a trailer, a towed vehicle, or a tow vehicle. In some applications, both the tow vehicle and the towed vehicle use the same socket. In some application, the towed vehicle and the tow vehicle use different sockets, and an adapter is used to make the connection. The plug 130 is configured as a round 6-pin trailer wiring harness plug, however any other suitable plug may be used. The plug includes a key 114 with a prong 116 in accordance with the configuration of the socket. The key 114 is aligned with and inserted into a keyway of the socket (not shown). The prong 116 is engaged by a hook (not shown) of the socket to hold the plug in the socket.

In the present description, vehicle is used generally as a means for carrying, transporting, or conveying something.

Accordingly, a tow vehicle may be a motor home, bus, a truck, a tractor, an automobile, or another powered vehicle capable of towing and equipped with a trailer wiring harness. A towed vehicle may be any vehicle capable of being towed and also equipped with a trailer wiring harness. In some use cases, the towed vehicle may be a second self-powered vehicle including a truck or automobile. In other use cases, it may be a trailer of any suitable type, e.g., a travel trailer, a cargo trailer, a boat trailer, a livestock trailer, or any other suitable trailer.

Figure 7:
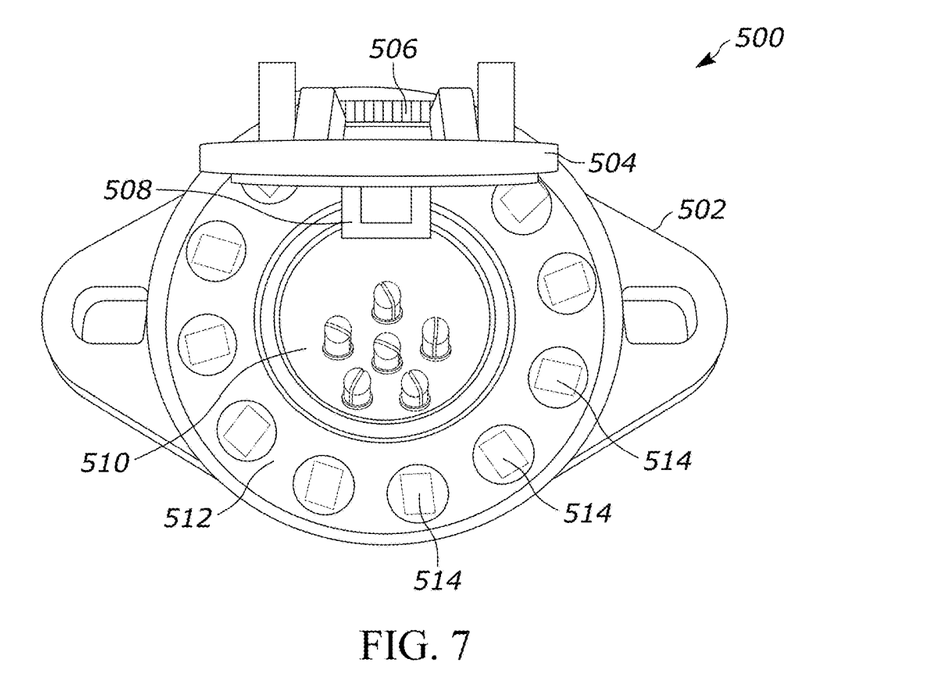
FIG. 7 is a plan view of a wiring socket adapter configured as part of a trailer wiring coupler having a lamp according to embodiments of the invention.

At the socket end 106 of the adapter, a socket 132 is provided and configured to receive a plug. The socket includes a keyway 120 to receive a key of the plug. In this example, the socket 132 has the same type of plug configuration that the plug 130 of the adapter 100 has, i.e., a round 6-pin trailer wiring socket. In this example, the socket 132 does not have a latch to engage a prong of the plug. Instead, a set screw 118 may be tightened against the plug. The set screw allows for a more rigid and permanent connection. The set screw also does not interfere with the lamps as described. The adapter may be modified to include a latch if desired and as shown in FIG. 7. The latch and set screw may be used together to provide a firmer grip by the adapter onto a plug inserted into the socket.

The adapter has an outer ring 108 at the socket end 106 of the adapter. The outer ring 108 serves as a handle to allow the adapter to be grasped and pulled out of a trailer wiring socket at the trailer wiring plug end of the adapter. Additional finger loops may be provided as additional handles to pull the adapter. The outer ring has a flange 112 surrounding the socket 132 and facing toward the opening of the socket. The flange serves as a surface by which the adapter may be pushed into a socket. Lamps 110 are attached to the flange. As shown, there are multiple lamps in the form of LEDs (Light-Emitting Diodes) around the outer circumference of the socket 132. In use, the ring of LEDs illuminates the area around the socket in all directions, so that a cable installed into the socket does not obscure the light and so that the illumination is even in many directions. The lamps 110 may each have a lens for protection and to provide a particular light distribution. Diffusion lenses to soften the light or Fresnel lenses to direct the light may be used or other lenses or combinations of lenses. Alternatively, other lenses or covers may be used on some or all of the lamps. While a ring of LEDs is shown, one or more lamps may be attached in a different way, e.g., as a strip or bar, as individual spots, or as a single lamp.

In the present example of FIG. 1, the trailer wiring plug has a circular cross-section. The trailer wiring socket also has a circular cross section. The trailer wiring plug and the trailer wiring socket are coaxial. The housing of the adapter is circular in cross-section and elongated along an axis between the first end and the second end roughly as a tube with a larger annulus at one end. The housing resembles a hollow tube with the prong 116, set screw 118 and the outer ring 108. The flange 112 and outer ring 108 also have a circular cross section that is coaxial with the trailer wiring socket and the trailer wiring plug. The tube-shaped configuration allows the external size of the adapter to be minimized. The adapter includes a plug, a socket, and a short central area for wiring purposes. A short central section provides for a small adapter. The tubular configuration is provided as an example, however other configurations may be used that include a connector at each end and one or more lamps in the middle that are illuminated by the trailer wiring harness.

The plug is a connector that is configured to be attached to a trailer wiring harness of a vehicle. That vehicle may be the tow vehicle, or the towed vehicle. In the illustrated example, the connector makes the connection to the trailer wiring harness through a mating socket on the vehicle. The plug has a set of holes or receptacles, and the socket has a set of pins, and the pins engage the holes to make the electrical connections. Different types of plugs and sockets may form the connections in different ways. Similarly, the socket is also a connector that is configured to be attached to a trailer wiring harness of a vehicle through a plug. In the illustrated example, the socket is configured to connect to a plug which may be at an end of a trailer wiring extension cable. The other end of the trailer wiring extension cable may have another plug to attach to the socket of the other vehicle.

Figure 2:
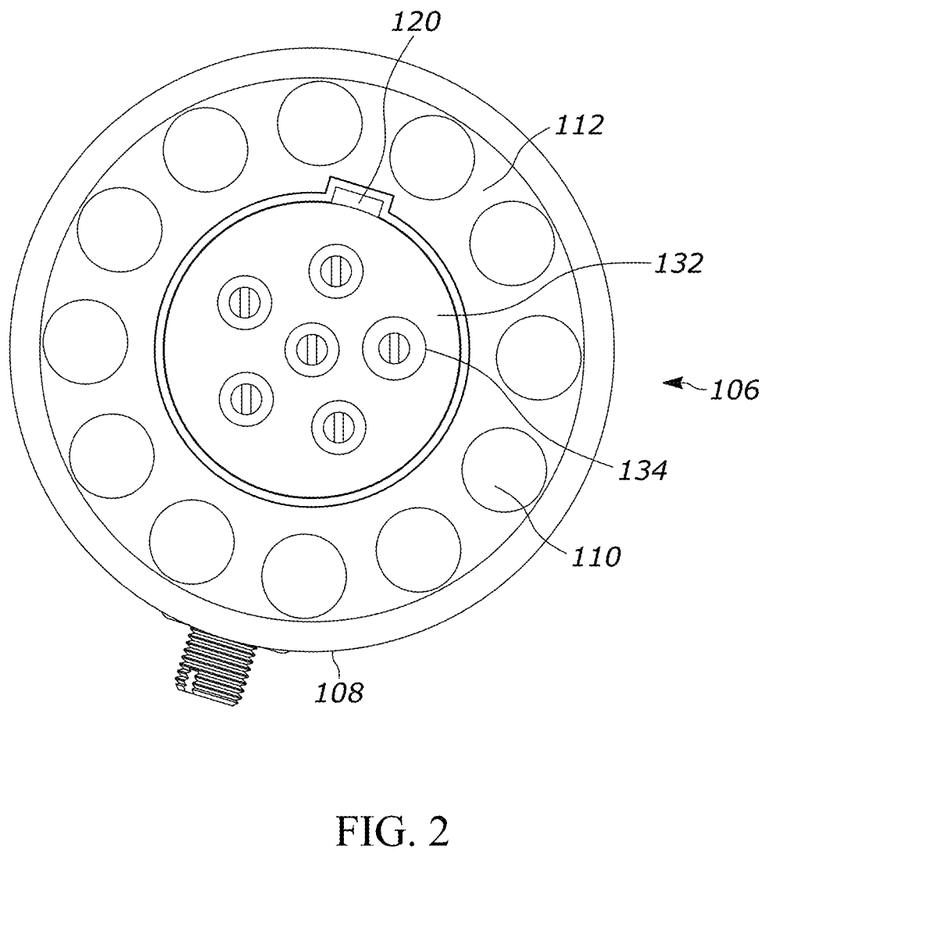
FIG. 2 is a plan view of the socket end of the wiring socket adapter according to embodiments of the invention.

FIG. 2 is a plan view of the socket end 106 of the wiring socket adapter. The socket 132 is centrally located and includes a keyway 120 to align a plug together with an array of six pins 134. The pins are configured to engage holes in the plug as suitable for this type of connector. As mentioned above, there are a variety of different trailer wiring connectors with 4, 5, 6, 7, 8, or 9 wires in round, square, linear, or flat, and other configurations, and with different locking mechanisms. The round 6-way socket is shown as an example.

The outer ring 108 surrounds the socket with the flange 112 facing out of the page in the same direction as the opening of the socket. Lamps 110 are mounted in the flange and also face out of the page in the same direction as the opening of the socket.

Figure 3:
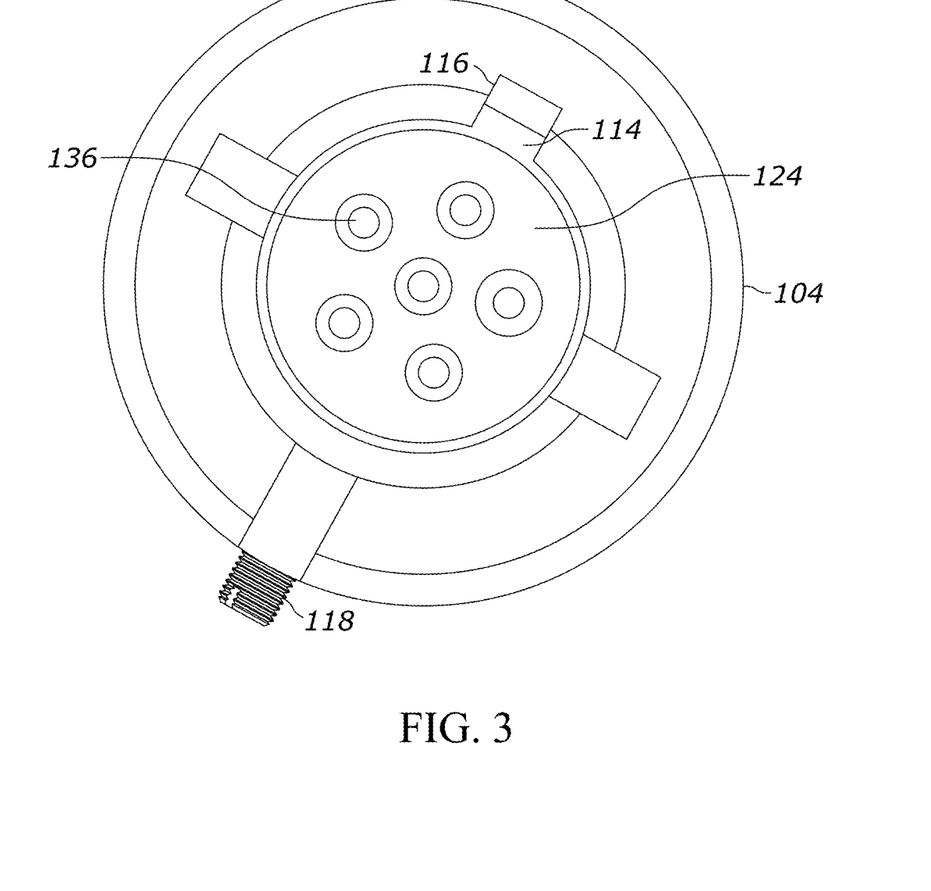
FIG. 3 is a plan view of the plug end of the wiring socket adapter according to embodiments of the invention.

FIG. 3 is a plan view of the plug end 104 of the adapter. The plug end looks very much like a 6-way trailer wiring plug so that it may be attached to a conventional 6-way trailer wiring socket. The plug has an array of holes 136 to receive the pins of the socket, a key 114 to engage a keyway of the socket and a prong 116 to be engaged by a hook of the socket.

In a towed vehicle context, a towed vehicle may be configured with a trailer wiring socket at the front of the vehicle. In normal use, to tow the towed vehicle, an extension cable is connected between a socket on the tow vehicle and the socket on the towed vehicle. The extension cable allows the tow vehicle to operate lights on the towed vehicle, e.g., tail lights, indicator lights, running lights, marker lights, etc. The lights may be those built into the vehicle or accessory lights that have been attached to the vehicle for purposes of towing.

In one scenario, the plug 130 of the adapter 100 is first inserted by the plug end 104 into the socket on the towed vehicle. The extension cable is then inserted into the socket 132 on the socket end 106 of the adapter. The other end of the extension cable is attached to the tow vehicle as is done without the adapter 100. This will cause the lamps 110 on the flange 112 to face away from the towed vehicle toward the tow vehicle and illuminate the tow zone. The effect is similar to headlights on the towed vehicle. The lamps 110 will illuminate the back of the tow vehicle in a manner similar to headlights. The effect may depend on the position of the socket on the tow vehicle. The lamps 110 will also illuminate the tow zone for the convenience of someone manipulating a hitch or other attachment and for the benefit of any cameras at the back of the tow vehicle. Alternatively, the plug 130 of the adapter may be inserted into a socket on the tow vehicle. In this configuration, the extension cable is used to electrically connect the adapter to the towed vehicle. This will cause the lamps 110 to be directed toward the towed vehicle. In effect and depending on socket mounting locations, this may cause a very similar effect in illuminating the tow zone.

Figure 4:
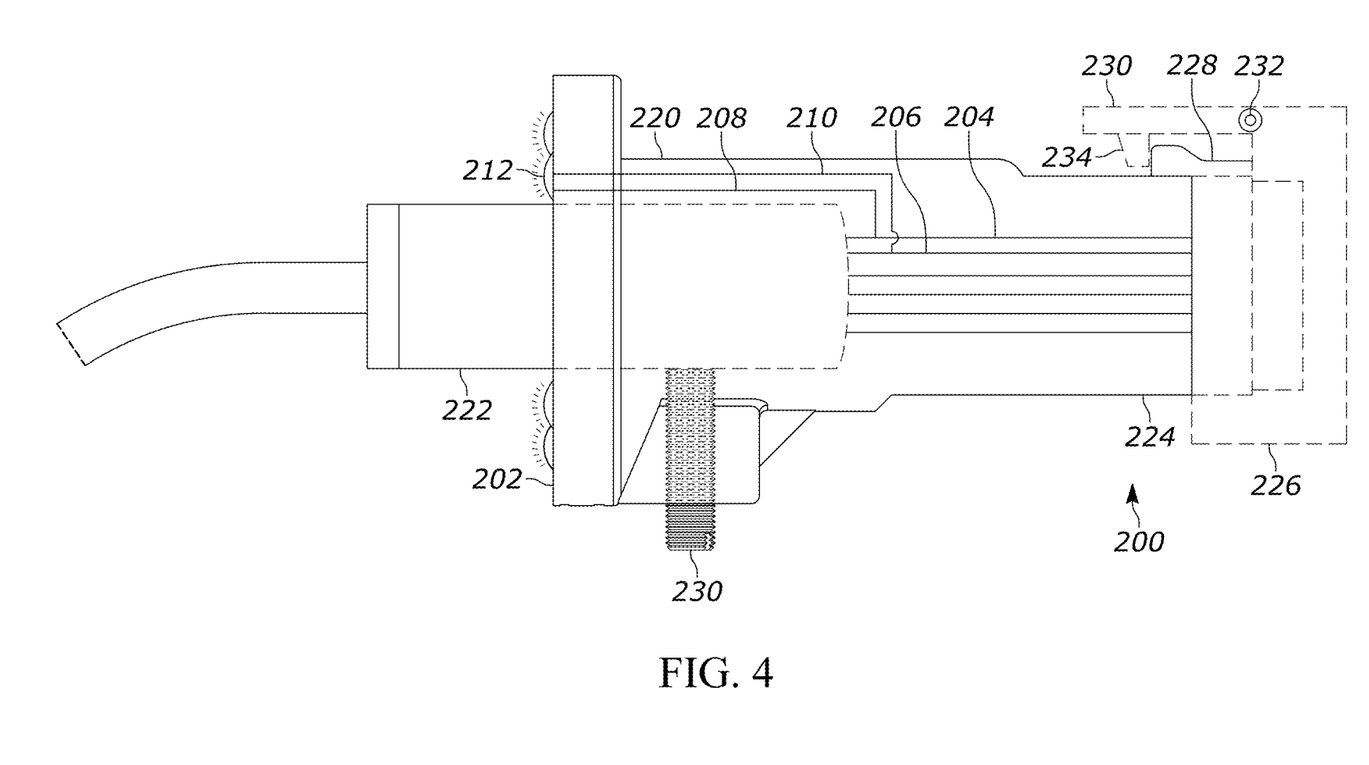
FIG. 4 is a diagram of a wiring socket adapter attached to a vehicle wiring socket according to embodiments of the invention.

FIG. 4 is a diagram of a wiring socket adapter 200 attached to a vehicle wiring socket. The wiring socket adapter 200 has a socket end 220. A trailer wiring plug 222 is inserted into the socket at the socket end. A set screw 230 optionally is screwed against the trailer wiring plug 222 to secure the plug in the socket. Other connector configurations may provide other ways for holding the adapter to the plug. The wiring socket adapter 200 has a plug end 224 that is configured to be inserted into a socket 226. The socket 226 has a hook 234 that engages a prong 228 of the plug end of the adapter. The hook and prong form a latch that secures the adapter in place in the same way that a plug for a trailer wiring extension cable may be secured. The hook and prong are shown as examples, different types of wiring plugs and sockets may have different features, e.g., blade contacts, twist lock, bayonet connection etc. The wiring socket adapter may be modified to suit different types of wiring plugs and sockets.

The wiring socket adapter may also be modified for one connector type at the plug end and a different connector type at the socket end. For example, one end of the adapter may be configured for a 5-pin or 6-pin connector and the other end of the adapter may be configured for a 7-pin or 8-pin connector. These are sometimes referred to a 5-way, 6-way, etc. connectors. By providing different connectors at each end of the adapter, a standard extension cable may be used between the adapter and the other vehicle, i.e. the vehicle to which the adapter is not mounted. The other vehicle is the vehicle connected to a cable instead of to the adapter.

Within the adapter, the connector at the socket end is connected to the connector at the plug end using wires, traces, or other conductors or a combination of conductors. FIG. 4 diagrammatically shows six wires extending between the socket end and the plug end. Two of the conductors are identified as lines 204, 206 extending from the socket at one connector, through the adapter to the plug at the other connector. Auxiliary wires 208, 210 tap into the two conductors 204, 206 and connect to a lamp 212 on a flange 202 of the adapter 200. The auxiliary wires are examples of electrical leads that conduct electricity from the socket to the lamps. While wires are shown, the electrical leads may be in any other form of one or more conductive materials. As mentioned, there may be multiple lamps around the flange and also in other locations on the adapter 200. The lamp 212 is provided as an example. The flange may include conductive lines or traces to connect to each of the lamps or the lamps may be coupled to each other.

In the 5-way trailer wiring connector, the five contacts are designated for ground, tail (running) lights, power, left marker (brake and turn indicator) light, and right marker light. A 6-way connector adds electric brakes, and a 7-way connector adds reversing (backup) lights. The adapter may be modified to suit these and other trailer wiring configurations. For the lamp 212, the tail light conductor 204 and the ground conductor 206 may be coupled to the lamp 212 to power the lamp so that the lamp 212 is driven whenever the tail lights are driven. This typically corresponds to when the tow vehicle is in operation and the ambient light is low. Alternatively, the lamp may be coupled to the power conductor and to the ground conductor so that the power pin powers the lamp 212 which is driven whenever the tow vehicle is providing power to the towed vehicle.

The wires 208, 210 may be formed in or installed into the housing for protection and may be placed into an interior channel of the housing for that purpose. The wires 208, 210 power the lamp 212 to operate together with the tow vehicle lights. The adapter connects the lamp 212 when it is inserted into a socket on either the tow vehicle or the towed vehicle or trailer. It is not necessary for a towed vehicle to be attached when a tow vehicle socket is used. For a tow vehicle with multiple sockets of different types, the adapter may be installed into a socket that is not connected to the towed vehicle or trailer. No consideration is required for the operation of the lamps other than the normal operation of the tow vehicle lamps.

Figure 5:
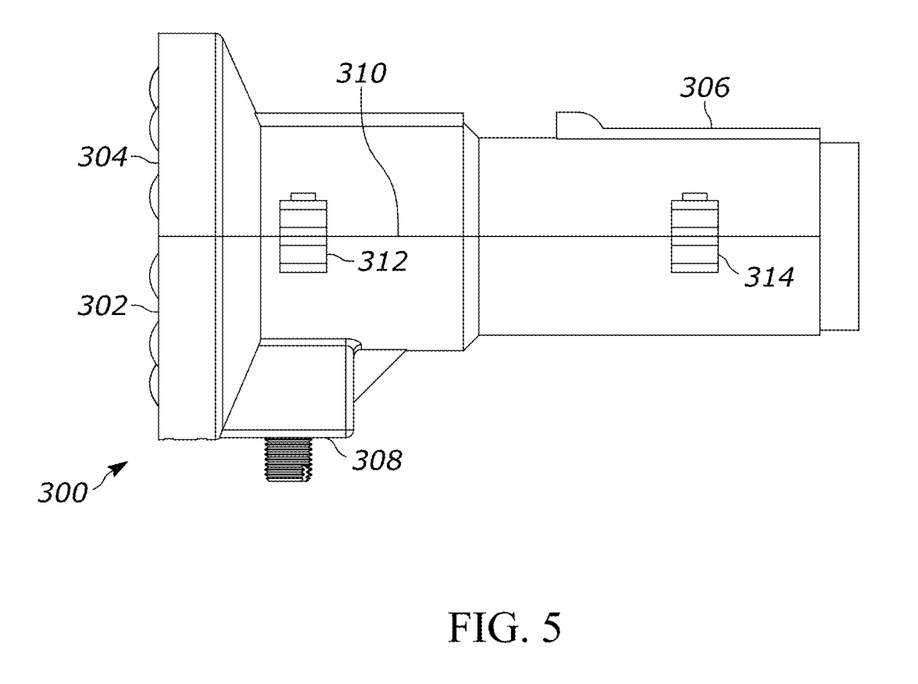
FIG. 5 is a diagram of an example two-part housing suitable for use with the wiring socket adapter according to embodiments of the invention.

FIG. 5 is a diagram of an example two-part housing suitable for use with the wiring socket adapter as described above. The housing 300 has a bottom half 302 and a top half 304. The bottom half 302 has a set screw fixture 308 to mount a set screw. The top half has a prong and key 306 to be guided and latched into a socket. The set screw and the key may be modified or replaced with other components to suit other types of trailer wiring connectors. A seam 310 runs along the axis of elongation of the housing between the two parts, the bottom half, and the top half. Fasteners 312, 314 at two or more places along the seam hold the bottom half and the top half together. A similar seam and fasteners may be present on the back side of the housing (not shown) to secure the housing together on both sides. While two parts are shown, there may be more.

In the illustrated example, the fasteners are formed of lands and screws. This allows the housing to easily be disassembled to change the wiring configuration or for other purposes. A variety of other fasteners may be used. The screws may be replaced with rivets, or nuts and bolts. One side may use hooks and loops so that screws or other fasteners are required only on one side. Other fastening technologies including adhesive, epoxy, thermal welding, etc. may be used instead of the screws.

In some examples, the housing is formed of die cast metal that may be stainless steel, galvanized, painted, or coated for corrosion protection. The interior then contains insulators to isolate the internal electrical signal from the housing. While many trailer wiring harnesses include a ground wire, in some examples, the metal exterior of the housing is used as an additional ground. In some examples, the housing is formed of a dielectric material, e.g., a plastic that is weather and sun resistant, e.g., a nylon or ABS (Acrylonitrile Butadiene Styrene) which may be epoxied, glued, and welded.

Figure 6:
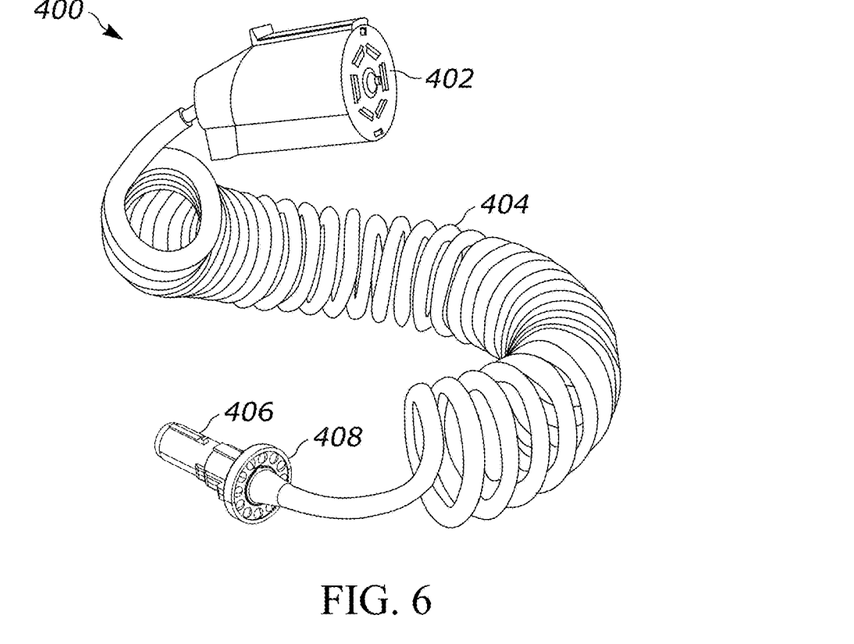
FIG. 6 is an isometric view of a wiring socket adapter configured as part of a trailer wiring harness extension cable according to embodiments of the invention.

FIG. 6 is an isometric view of a wiring socket adapter configured as part of a trailer wiring harness extension cable. The trailer wiring extension cable 400 has a first plug 402 at one end configured to be plugged into a socket. The socket may be on either the tow vehicle or the towed vehicle. The trailer wiring extension cable has a second plug 406 at a second end opposite the first end that is configured to be plugged into a socket on the other of the towed vehicle or the tow vehicle. The second plug has one or more lamps 408 to illuminate the tow zone. The lamps may have a configuration similar to that described above.

The FIG. 6 adapter may be formed using the housing of FIG. 1 and replacing the socket with a fixed connector for the extension cable. Alternatively, the FIG. 6 adapter may be formed by adding a lamp to an extension cable. The electrical lead to power the lamp may be the same as or similar to that as shown in FIG. 4. As shown, the second plug 406 is a connector at one end of the housing configured to be attached to a trailer wiring harness of a vehicle by inserting the plug into a socket on a vehicle. At the other end of the housing near the lamp 408, there is a connector configured to be attached to a trailer wiring extension cable. The trailer wiring extension cable is attached to the housing at one end where it is electrically coupled to the connector of the housing. The first trailer wiring plug 402 is attached to the other end of the trailer wiring extension cable opposite the connector at the second end. The lamp 408 is coupled within the housing to the trailer wiring harness to receive power from the trailer wiring harness. The trailer wiring harness connects the tow vehicle to the towed vehicle through the extension cable and the various plugs and sockets. The lamp is coupled to the trailer wiring harness as the harness passes through the adapter, a plug, or a socket.

In the example of FIG. 6 the first plug 402 has a 7-way blade plug and the second plug 406 has a 6-way pin plug. This is shown as an example for providing an adapter with the extension cable. The connections may be reversed so that the second plug is a 7-way blade plug or other types of plugs may be used.

FIG. 7 is a plan view of a wiring socket adapter configured as part of a trailer wiring coupler having a lamp. The coupler 500 is configured with a 6-way socket discussed above, although other configurations may be used. The coupler 500 has a mounting plate 502 a cover 504, a piano hinge 506 to hold the cover 504 to the coupler 500 and to press the cover closed when not in use. A hook 508 is attached to or formed with the cover 504 to engage a prong of a plug. The coupler 500 has a socket 510 for a 6-way round plug. The cover 504 is configured to cover the socket 510 when not in use. A flange 512 has an array of lamps 514, e.g., LEDs to illuminate the tow zone when powered by the trailer wiring harness.

In this example, the coupler 500 has a housing that includes the mounting plate 502, the socket 510, and the flange 512. The coupler mounting plate 502 allows the coupler to be mounted to the tow vehicle or to the towed vehicle. A connector (not shown) at a first end of the housing behind the socket 510 is configured to be attached to a trailer wiring harness of a vehicle. The attachment may be done by splicing into the wiring of the respective vehicle. A connector at a second end of the housing, in this case the socket 510, configured to be attached to a trailer wiring extension cable using a plug at the end of the extension cable. The lamps 514 are at that second end of the housing and, within the housing, an electrical lead is coupled to the lamp within the housing to power the lamp and is coupled to the trailer wiring harness to receive power from the trailer wiring harness.

Figure 8:
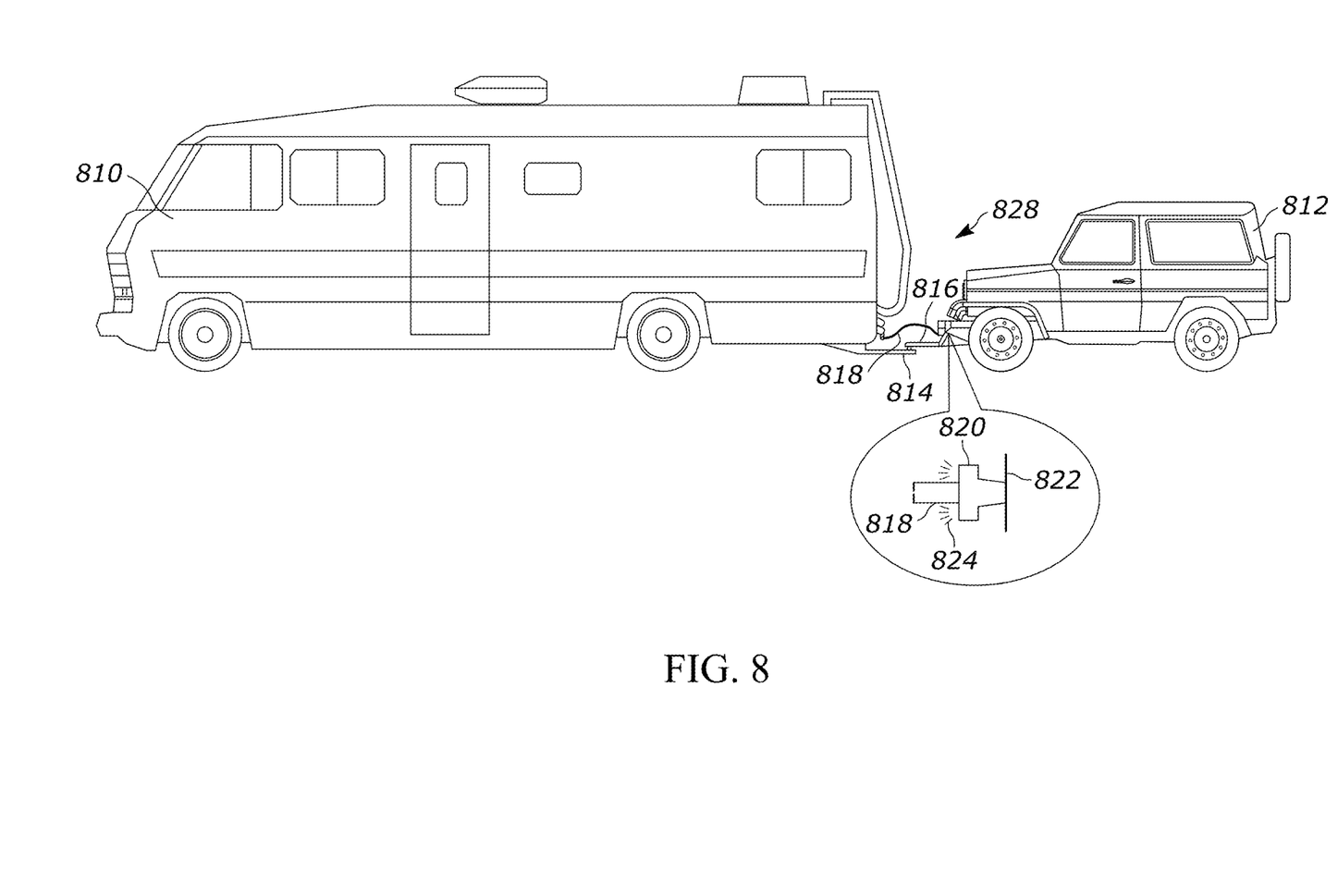
FIG. 8 is a diagram of a tow zone in which a wiring socket adapter with illumination may be used according to embodiments of the invention.

FIG. 8 is a diagram of a typical context in which a wiring socket adapter with illumination, such as described herein may be used. A tow vehicle 810 pulls a towed vehicle 812. In the illustration, the tow vehicle is a motor home, and the towed vehicle is a light reconnaissance vehicle. However, the tow vehicle may be any type of car, truck, van, bus, or recreational vehicle and the towed vehicle may be any lighter vehicle including a trailer or tow dolly. The tow vehicle has a tow hitch 814 and the towed vehicle has a tow bar 816. The tow bar attaches to the hitch for towing. When the towed vehicle is unhitched for separate use, the tow bar is removed or folded out of the way. For a trailer, the tow bar may be incorporated into or attached to the trailer frame. The area 828 between the tow vehicle and the towed vehicle is referred to herein as the tow zone.

In the tow zone 828, an electrical cable, e.g., an extension cable 818 electrically connects the towed vehicle trailer wiring harness to the tow vehicle trailer wiring harness for lights, power, and other purposes. An adapter 820 is coupled to the towed vehicle 812 or to the tow vehicle 810 to illuminate the tow zone. The adapter 820 is attached to a socket 822 on the tow vehicle. The extension cable 818 is attached to the adapter 820. The power from the tow vehicle in the extension cable is used to power lamps 824 to illuminate the tow zone. As mentioned, the adapter may alternatively be configured as a part of a trailer wiring extension cable as in FIG. 6 or as a part of a trailer wiring socket as in FIG. 7.

An adapter with tow zone illumination is described that in some embodiments includes a housing, a plug at a first end of the housing configured to be attached to a trailer wiring socket of a vehicle, a socket at a second end of the housing configured to be attached to a trailer wiring plug, a lamp at the second end of the housing, and an electrical lead coupled to the lamp at the second end of the housing to power the lamp and coupled to the socket at the first end of the housing to receive power from the socket.

Some embodiments include a flange surrounding the socket, wherein the lamp is mounted to the flange. In some embodiments, the flange is configured as an annulus surrounding the socket. In some embodiments, the lamp comprises a plurality of light emitting diodes, mounted to the annulus.

Some embodiments include a latch to engage the trailer wiring socket of the vehicle. In some embodiments, the latch comprises a prong configured to engage a hook of the trailer wiring socket of the vehicle. Some embodiments include a set screw to engage the trailer wiring plug.

In some embodiments, the plug has a circular cross-section, wherein the socket has a circular cross section, and wherein the plug and the socket are coaxial. Some embodiments include a flange surrounding the socket and wherein the flange has a circular cross-section that is coaxial with the socket. In some embodiments, the socket has a plurality of pins configured to electrically connect to the plug.

In some embodiments, the housing is formed of a dielectric material. In some embodiments, the dielectric material is nylon. In some embodiments, the housing has an axis of elongation between the first end and the second end and wherein the housing is formed of two parts that are divided along the axis of elongation.

In some embodiments an apparatus includes a housing, a connector at a first end of the housing configured to be attached to a trailer wiring harness of a vehicle, a connector at a second end of the housing configured to be attached to a trailer wiring extension cable, a lamp at the second end of the housing, and an electrical lead coupled to the lamp within the housing to power the lamp and coupled to the trailer wiring harness to receive power from the trailer wiring harness.

Some embodiments include the trailer wiring extension cable attached to the housing and coupled to the connector at the second end, and a trailer wiring plug attached to an end of the trailer wiring extension cable opposite the connector at the second end.

In some embodiments, the connector at the first end is a trailer wiring plug. In some embodiments, the connector at the first end is a trailer wiring socket. In some embodiments, the trailer wiring socket is configured to be attached to the towed vehicle.

A trailer wiring plug adapter is described that in some embodiments includes a first connector at a first end having a plug configured to be attached to a towed vehicle trailer wiring socket, a second connector at a second end configured to be attached to a trailer wiring harness extension cable, and a flange configured as an annulus surrounding the second connector, a plurality of lamps mounted to the flange and facing away from the towed vehicle, wherein the lamps are powered through the trailer wiring harness extension cable. In some embodiments, the plug end comprises a key to engage a keyway of the trailer wiring socket.

While the present description is provided in the context of a plug with illumination around a socket, many of the structures, features and operations may also be used with an extension cable or a socket with illumination. In embodiments, more or fewer lamps may be used. The configuration of the flange for carrying the lamps may be modified to suit different form factors and different mounting locations. Any structure described as circular may be formed as flat, rectangular, or polygonal to suit different types of plugs and sockets. While the lamps are described as working with the running lamps, additional lamps may be added to work with other functions through other wires in the trailer wiring harness, e.g., stop lights, reversing lights, or turn indicators. These may be in addition to or instead of the running (indicator) lights.

A lesser or more equipped wiring socket adapter than the examples described above may be desirable for certain implementations. Additional features may be added to the adapter without interfering with the lighting and electrical connections. Therefore, the configuration of the system will vary from implementation to implementation depending upon numerous factors, such as price constraints, performance requirements, technological improvements, and/or other circumstances.

The present description presents the examples using particular terms, such as towed vehicle, plug, trailer wiring harness, socket, flange, hook, prong, etc. These terms are used to provide consistent, clear examples, however, the present invention is not limited to any particular terminology. Similar ideas, principles, methods, apparatus, and systems can be developed using different terminology in whole, or in part. In addition, the present invention can be applied to ideas, principles, methods, apparatus, and systems that are developed around different usage models and hardware configurations.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. An apparatus:
   a housing;
   a plug at a first end of the housing configured to be attached to a trailer wiring socket of a vehicle;
   a socket at a second end of the housing configured to be attached to a trailer wiring plug;
   a lamp at the second end of the housing; and
   an electrical lead coupled to the lamp at the second end of the housing to power the lamp and coupled to the socket at the first end of the housing to receive power from the socket.

2. The apparatus of claim 1, further comprising a flange surrounding the socket, wherein the lamp is mounted to the flange.

3. The apparatus of claim 2, wherein the flange is configured as an annulus surrounding the socket.

4. The apparatus of claim 3, wherein the lamp comprises a plurality of light emitting diodes, mounted to the annulus.

5. The apparatus of claim 1, further comprising a latch to engage the trailer wiring socket of the vehicle.

6. The apparatus of claim 5, wherein the latch comprises a prong configured to engage a hook of the trailer wiring socket of the vehicle.

7. The apparatus of claim 1, further comprising a set screw to engage the trailer wiring plug.

8. The apparatus of claim 1, wherein the plug has a circular cross-section, wherein the socket has a circular cross section, and wherein the plug and the socket are coaxial.

9. The apparatus of claim 8, further comprising a flange surrounding the socket and wherein the flange has a circular cross-section that is coaxial with the socket.

10. The apparatus of claim 1, wherein the socket has a plurality of pins configured to electrically connect to the plug.

11. The apparatus of claim 1, wherein the housing is formed of a dielectric material.

12. The apparatus of claim 11, wherein the dielectric material is nylon.

13. The apparatus of claim 12, wherein the housing has an axis of elongation between the first end and the second end and wherein the housing is formed of two parts that are divided along the axis of elongation.

14. An apparatus:
   a housing;
   a connector at a first end of the housing configured to be attached to a trailer wiring harness of a vehicle;
   a connector at a second end of the housing configured to be attached to a trailer wiring extension cable;
   a lamp at the second end of the housing; and
   an electrical lead coupled to the lamp within the housing to power the lamp and coupled to the trailer wiring harness to receive power from the trailer wiring harness.

15. The apparatus of claim 14, further comprising:
   the trailer wiring extension cable attached to the housing and coupled to the connector at the second end; and
   a trailer wiring plug attached to an end of the trailer wiring extension cable opposite the connector at the second end.

16. The apparatus of claim 14, wherein the connector at the first end is a trailer wiring plug.

17. The apparatus of claim 14, wherein the connector at the first end is a trailer wiring socket.

18. The apparatus of claim 17, wherein the trailer wiring socket is configured to be attached to the towed vehicle.

19. A trailer wiring plug adapter comprising:
   a first connector at a first end having a plug configured to be attached to a towed vehicle trailer wiring socket;
   a second connector at a second end configured to be attached to a trailer wiring harness extension cable;
   a flange configured as an annulus surrounding the second connector; and
   a plurality of lamps mounted to the flange and facing away from the towed vehicle,
   wherein the lamps are powered through the trailer wiring harness extension cable.

20. The trailer wiring plug adapter of claim 19, wherein the plug end comprises a key to engage a keyway of the trailer wiring socket.

* * * * *